(No Model.)  3 Sheets—Sheet 1.

W. H. MYERS.
SHINGLE SAWING MACHINE.

No. 575,899. Patented Jan. 26, 1897.

Witnesses:
J. Staib
Chas. H. Smith

Inventor:
Wm. H. Myers
per L. W. Serrell & Son
Attys (No Model.) 3 Sheets—Sheet 2.

W. H. MYERS.
SHINGLE SAWING MACHINE.

No. 575,899. Patented Jan. 26, 1897.

Witnesses:
J. Staib
Chas. H. Smith

Inventor:
Wm. H. Myers
L. W. Serrell & Son
Attys (No Model.)
3 Sheets—Sheet 3.

W. H. MYERS.
SHINGLE SAWING MACHINE.

No. 575,899. Patented Jan. 26, 1897.

Witnesses:
J. Staib
Chas. H. Smith

Inventor:
Wm. H. Myers
per
L. W. Serrell & Son
Attys

UNITED STATES PATENT OFFICE.

WILLIAM H. MYERS, OF BROOKLYN, NEW YORK, ASSIGNOR TO GRANT B. SCHLEY, OF NEW YORK, N. Y.

SHINGLE-SAWING MACHINE.

SPECIFICATION forming part of Letters Patent No. 575,899, dated January 26, 1897.

Application filed May 6, 1896. Serial No. 590,421. (No model.)

*To all whom it may concern:*

Be it known that I, WILLIAM H. MYERS, a citizen of the United States, residing at Brooklyn, in the county of Kings and State of New York, have invented an Improvement in Shingle-Sawing Machines, of which the following is a specification.

Shingles have heretofore been manufactured from a block or bolt of wood, and where the shingles are sawed off the block has been moved between one cut and the next, so as to saw the shingles wedge-shaped, or thicker at the one end than the other.

The object of the present invention is to saw up the block or bolt of wood into shingles by two gangs of circular saws by passing the block over one gang of saws and then changing the position of the block and passing it over the next gang of saws, so as to subdivide the slabs that are produced by the first gang of saws by diagonal cuts that produce the shingles with the thickest end of one adjacent to the thin end of the next shingle, thereby cutting up the entire block or bolt into shingles by two operations.

The present invention relates to the combination of devices hereinafter more fully described.

Figure 1:
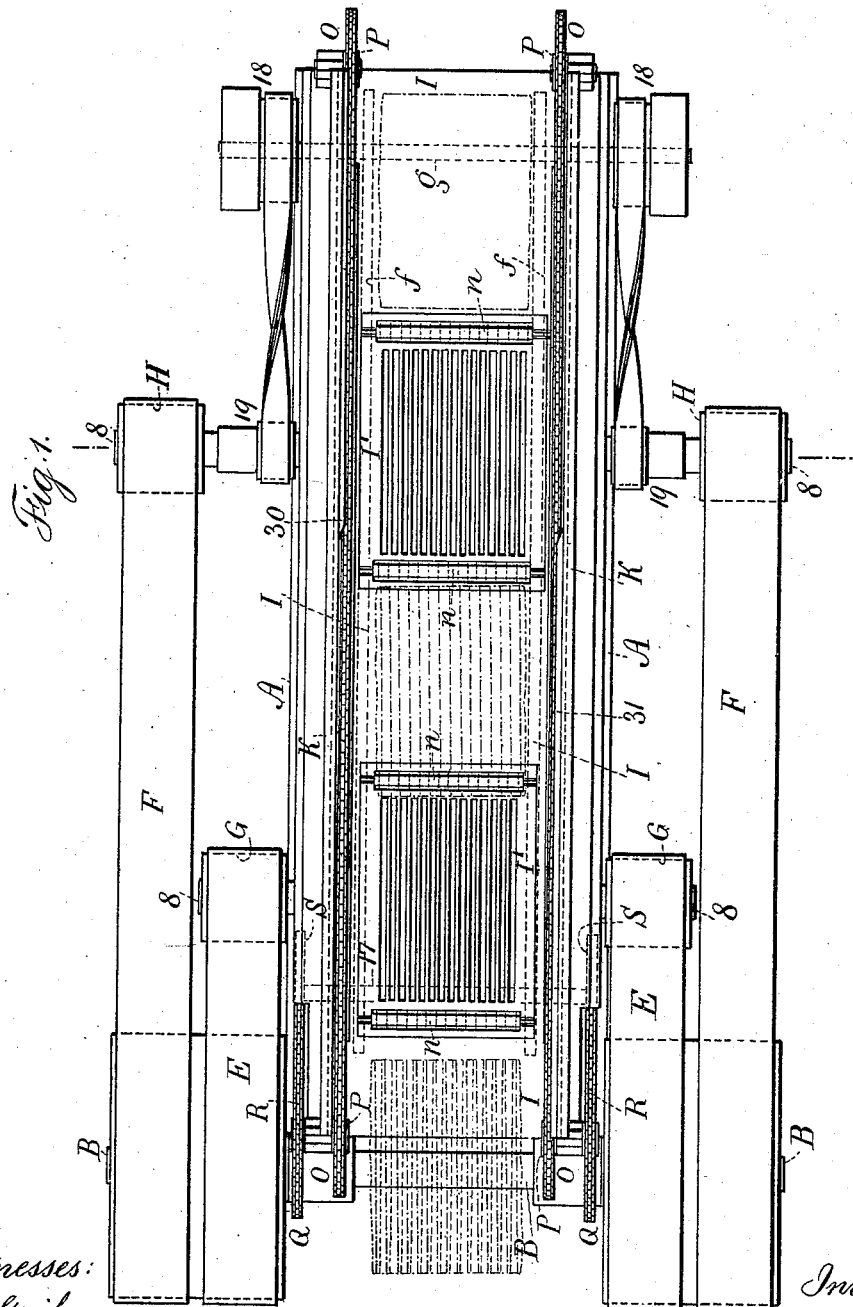
Figure 2:
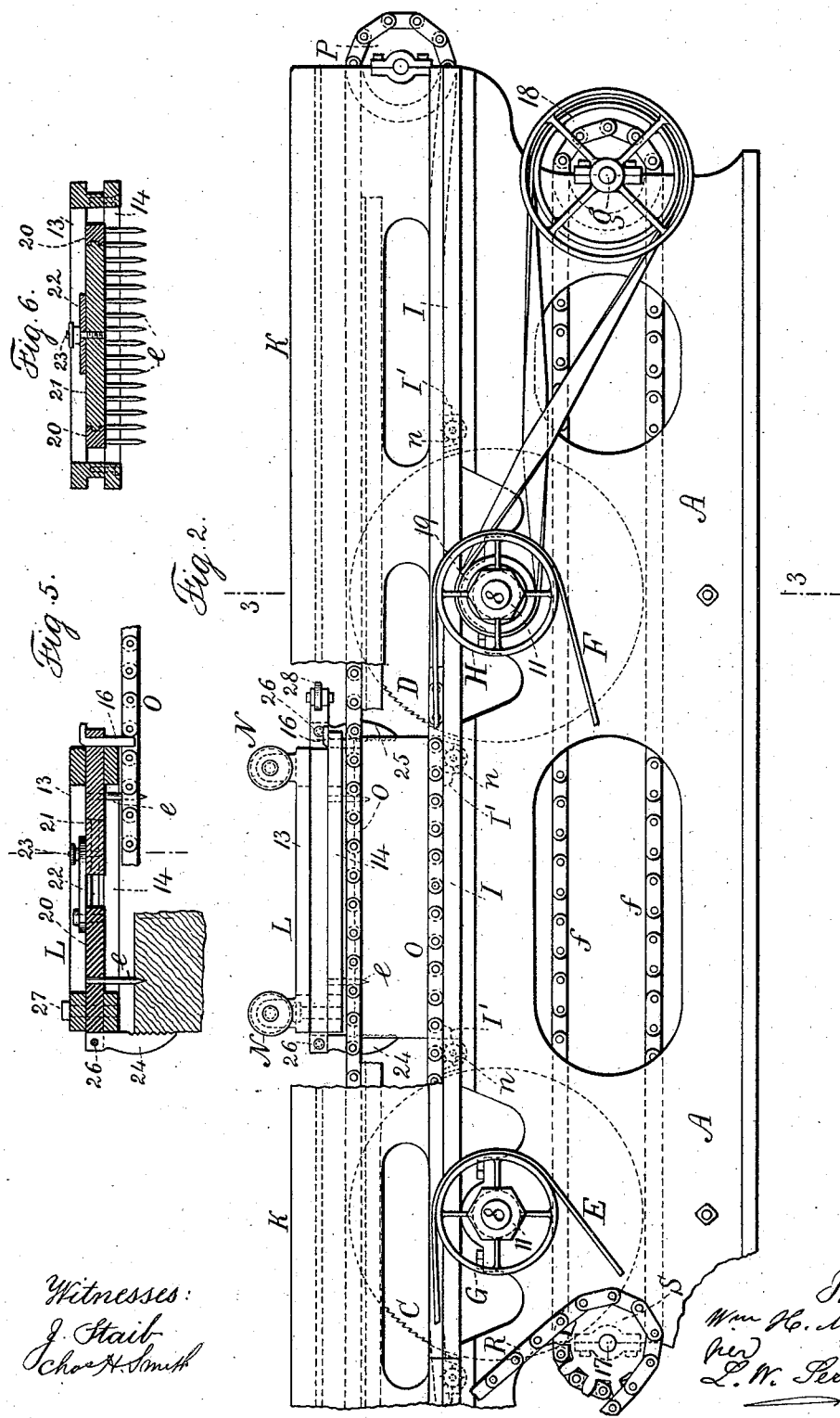
Figure 3:
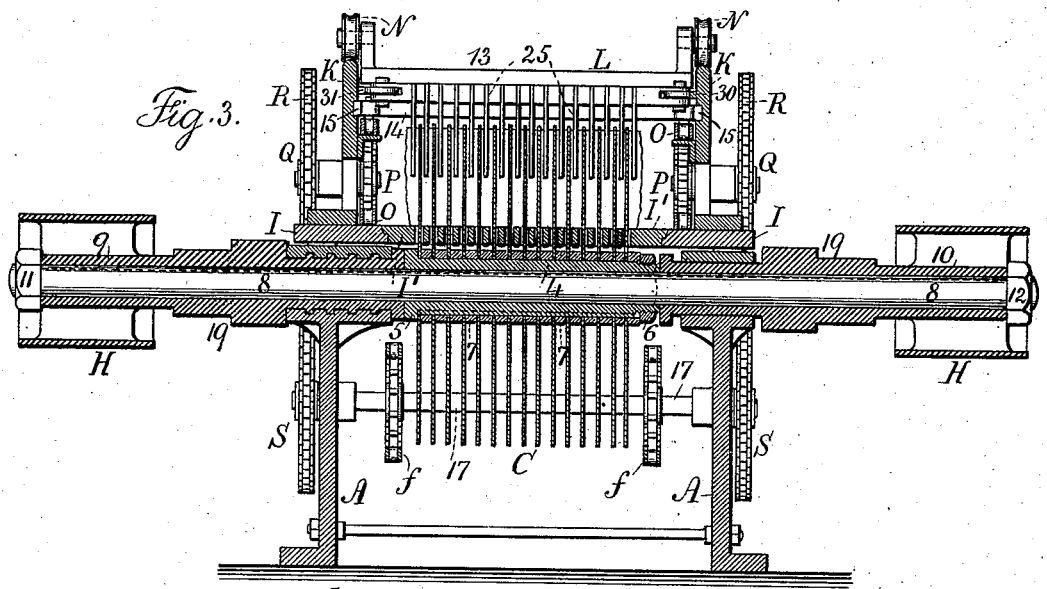
Figure 4:
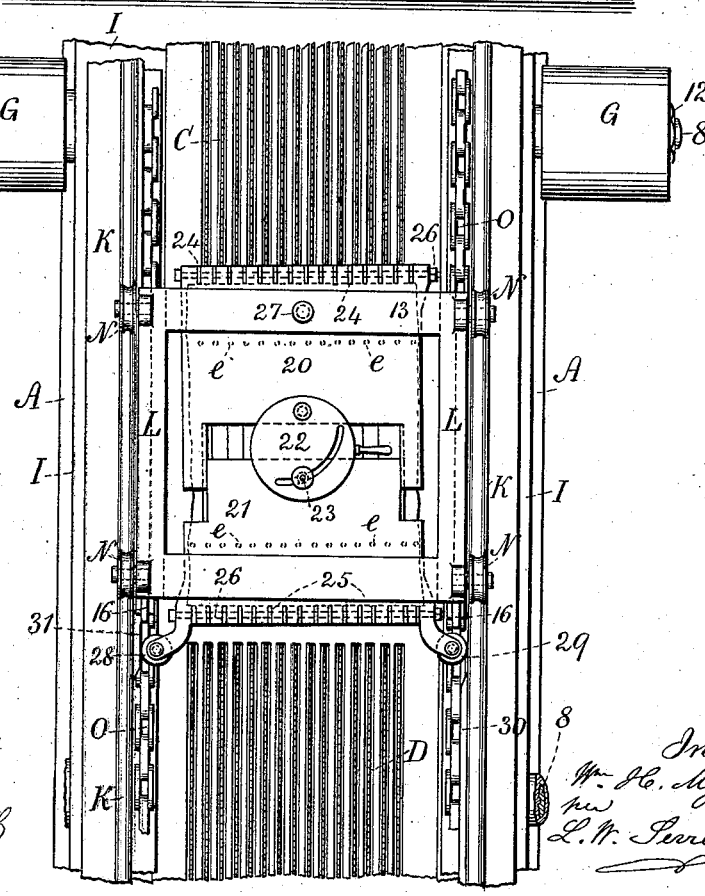

In the drawings, Figure 1 is a diagrammatic plan view of the machine without the saws and carriage. Fig. 2 is a partial side elevation. Fig. 3 is a cross-section at 3 3, Fig. 2. Fig. 4 is a plan of the carriage and part of the frames. Fig. 5 represents a horizontal section of the carriage, and Fig. 6 is a cross-section of the same.

The side frames A are connected together by suitable cross frames or columns, and the driving-shaft B is advantageously located at one end of the machine, and the power is applied by a suitable pulley and belt, and there are two gangs of saws C and D, and these are driven by belts E F from the pulleys upon the driving-shaft B to pulleys G H upon the shafts of the saws, and the frame is suitably constructed for receiving and holding the journal-boxes or bearings of the respective shafts, and there is a top plate I to the frame and an elevated track K for the carriages L, that are constructed as hereinafter described and receive the blocks of wood and present them to the circular saws of the gangs of saws.

Any desired number of circular saws may be made use of in each gang, and these saws are connected upon the spindle or arbor in the following manner: The tube 4 corresponds in external diameter with the eye of each saw, and this tube has a head 5 at one end and a nut 6 at the other end, and there is advantageously a key or feather running lengthwise along the surface of this tube 4, that is received by notches in the saws at their eyes, and the washers 7 are introduced between one saw and the next, so that by threading on the saws and washers alternately the gang of saws will be made up and clamped firmly by the nut 6, and the shaft 8 is passed endwise through the tube 4, and there is a longitudinal key seat or channel in the shaft for receiving the feather or spline for connecting the gang of saws with the shaft, but allowing the shaft to be drawn out endwise with facility.

The pulleys G and H are not connected directly to the shafts of the gangs of saws, but they are keyed upon or cast with the tubular bushings 9 10, or the parts cast in one and through which the shaft 8 can be passed endwise, and these tubular bushings are supported and revolve in the bearings or journal-boxes of the side frames A, and there are nuts 11 and 12 at the respective ends of the shaft 8, and it will now be understood that when the parts are put together and these nuts tightened the pulleys, tubular bearings, and gang of saws will be revolved all together by and with the connecting-shaft 8, and when the gang of saws is to be removed it is only necessary to take off the nut 11 or 12 and draw the shaft 8 out endwise, and the gang of saws becomes separated and can be taken out as a whole from either above or below the machine, so as to be sharpened or to be replaced by another gang of saws for cutting different shingles. This construction gives great facility because there is but little loss of time in taking out one gang of saws and putting in another one.

It is to be understood that both gangs of saws are constructed in the same manner, and I find it advantageous to apply pulleys at both ends of each saw-arbor, so as to render the strain and wear equal at both ends, and use belts that are narrower than would be necessary in obtaining the proper power in driving the gang of saws.

The carriages L are each made with upwardly-projecting ears and wheels N, resting upon the elevated track K, and each carriage is made with an upper frame 13 and a lower frame 14, permanently connected together at their edges, and the ends of the lower frame 14 run in slideways 15 in the lower portions of the elevated track K, so that the carriages cannot be lifted, but they will run freely, as they are supported by the wheels N upon the tracks, and the carriages are to be entered at one end of the elevated track and delivered at the other end of such elevated track, and in order to move the carriages along perfectly and regularly I make use of the endless chains O, running around the sprocket-wheels P, and these chains may have at suitable intervals projecting dogs that come against the lower frame 14 of each carriage; but I prefer to use bolts 16, passing through the carriage and between the chain-links.

The blocks or bolts of wood from which the shingles are sawed are suspended from below the carriages, as hereinafter described, and in order to give ample space for the insertion and removal of the carriages and the blocks of wood the shafts of the sprocket-wheels P do not extend across the machine, and in order to drive the sprocket-wheels and chains so that the dogs may move with uniformity I make use of sprocket-wheels Q upon the shafts of the sprocket-wheels P and chains R to sprocket-wheels S upon the cross-shaft 17, which cross-shaft is driven by endless chains $f$ and shaft $g$, and a belt from pulleys 18 and 19 to one of the saw-shafts. The portion of the endless chain that is not in action upon the carriages for moving them along progressively slides upon the top plate I, that projects inwardly below the parts of the frames carrying the elevated tracks K.

Upon each carriage and between the upper frame 13 and lower frame 14 is the two-part clamping-plate 20 21, there being side guides on the plate 20, receiving between them the central portion of the clamping-plate 21, and there is a cam 22, pivoted upon the plate 20 and having a cam-slot acting upon a pin 23 to draw the plate 21 toward the plate 20 for clamping the block or bolt of wood, as hereinafter set forth.

At the front end of the clamping-plate 20 and at the back end of the clamping-plate 21 there are vertical incisions or notches at the proper distances apart and usually one more in number than the number of saws in either gang, and in these vertical incisions there are hanging dogs 24 and 25, secured by bolts 26, passing through the dogs and through intervening tongues, so that these dogs are firmly connected to the respective clamping-plates, and the opposite faces of these dogs should be notched to form teeth, and the dogs are sufficiently thin to pass freely through between the saws in the gangs of saws.

It is now to be understood that the block or bolt of wood, sawed of suitable size, is to be placed with its upper surface near the under surface of the lower frame 14 in the carriage and between the hanging dogs, and the cam 22 is then turned to draw the plate 21 toward the plate 20 and firmly clamp the block of wood between the hanging dogs, and it is to be understood that the grain of the wood in the block is lengthwise, so that the saws act in the direction of the grain of the wood. The plate 20 is pivoted at 27 between the upper frame 13 and the lower frame 14 at the advancing end of the carriage, and the plate 21 can be slid laterally at the rear end of the carriage and between such upper frame 13 and the lower frame 14, and there are rollers 28 and 29 upon vertical axes in jaws that project from the rear corners of the plate 21, and upon the inner surfaces of the elevated track K there are cam-bars 30 and 31, and the thicknesses of these cam-bars correspond approximately to the thickness of the shingle at its thickest end, and these cam-bars are placed, as illustrated in Figs. 1 and 4, so that when the carriage with its block of wood is being moved along upon the elevated track and the first gang of saws is dividing up the block of wood into slabs of uniform thickness the roller 28 is running against the inner surface of one track-bar K, and the roller 29 is running against one of the parallel cam-bars 30, and as soon as the block of wood is sawed up by the first gang of saws into the parallel slabs the roller 28 comes into contact with the inclined end of the parallel cam-bar 31 and moves the plates 20 and 21 and the dogs and the block of wood at this end of the carriage, so that the roller 29 comes into contact with the inner surface of the opposite track-bar, and hence the block of wood is so shifted that the incisions that have been made by the first gang of saws are at an inclination to the second gang of saws. Hence when the slabs have been sawed by the second gang they are cut up into shingles, the thick end of one shingle coming next to the thin end of the next shingle. Thus the whole block is cut up into shingles, and it will be observed that the hanging dogs 24 and 25 are adjacent to the thick ends of the completed shingles and the rear dogs carry the slabs through the second gang of saws in completing the sawing operation, but in order to prevent the shingles dropping or becoming thrown out of place by the second gang of saws as the sawing operations are completed I find it advantageous to make use of pins $e$ upon the under side of the clamping-plate 20 and 21 and near the hanging dogs 24 and 25, so that these pins penetrate the edges of the shingles at the thicker ends and hold them up to the dogs, so that they do not become displaced, and the shingles can be easily removed from the carriage at the back end of the machine by slackening the cam 22, so that said shingles drop and the carriage can be taken out from the elevated tracks and another block of wood inserted for the operations to be repeated.

It is to be understood that the carriage and the shingles are lifted off by hand at the back end of the machine and the shingles separated and another block inserted in the carriage and the carriage reëntered at the other end of the machine and connected with the endless chains that carry the same through, and the chains will separate automatically from the dogs 16 at the delivery end of the machine, and such dogs are to be pushed down between the links of the chain at the proper time for connecting the carriage to the chains for such carriage to be carried through the machine.

It is to be borne in mind that the relative positions of the two gangs of saws may be such that the shingles will be left of the proper thickness at the thinnest ends, and the hanging dogs 24 will not be materially changed laterally by the swing of the clamping-plates, dogs, and block of wood upon the pivot 27, but the dogs 25 will be carried laterally, so as to pass between different saws in the second gang to do what they do in the first gang.

In Fig. 1 the saws are not represented in order to show the other parts more clearly, and I find it advantageous to provide openings in the bed or top plate I, into which are received slotted plates I', similar to grates, the bars of these plates passing between the saws, and hence the lower surface of the block of wood can slide upon the top plate I and the grates I', and it is also advantageous to apply transverse rollers $n$ in these grates I', the top surfaces of these rollers being slightly above the top surfaces of the plate I and the grates I', so as to lessen the friction as the block of wood is moved along progressively.

Between the grates I', I have represented by dotted lines the block of wood after it has received one set of saw-cuts and been moved ready for receiving the second set of saw-cuts, and at the end portion of the top plate I, I have shown by dotted lines the block of wood after it has received two sets of saw-cuts to form the wedge-shaped shingles.

I claim as my invention—

1. The combination in a machine for sawing shingles, of two gangs of saws, a track and a carriage supported by that track, dogs supported by the carriage and means for clamping the dogs against the block of wood, means for moving the carriage and block of wood along progressively on the track, and means for moving the dogs and block of wood at one end laterally between the first and second gangs of saws, so that the incisions made by the first gang of saws are diagonal to the incisions made by the second gang of saws, substantially as set forth.

2. The combination in a machine for sawing shingles, of two gangs of rotary saws, carriages having hanging dogs and means for pressing the dogs against the block of wood to be sawed, the pivotal connections between the carriage and the clamping devices near one end, rollers near the other end of the clamping devices, and parallel cam-bars for holding the parts during the sawing operations and for shifting the position of the clamping devices between one sawing operation and the next, substantially as specified.

3. The combination with the gangs of saws and the elevated track, of a carriage and rollers running on the elevated track, clamping-plates and hanging dogs for holding the block of wood, the pivot for connecting the clamping-plates to the carriage, rollers and cam-bars for guiding the clamping-plates and shifting the dogs and block between one sawing operation and the next, and endless chains for moving the carriages along progressively from one end of the machine to the other, substantially as specified.

4. The combination with the gangs of saws and the elevated track, of a carriage and rollers running on the elevated track, clamping-plates and hanging dogs for holding the block of wood, the pivot for connecting the clamping-plates to the carriage, rollers and cam-bars for guiding the clamping-plates and shifting the dogs and block between one sawing operation and the next, and endless chains for moving the carriages along progressively from one end of the machine to the other, and sprocket-wheels and endless chains for driving the sprocket-wheels and chains that act upon the carriages, substantially as set forth.

5. The combination with the circular saws, of a tube receiving such saws, intermediate washers and a clamping-nut, a shaft passing through the tube, tubular bushings passing through the bearings upon the frame of the machine, and driving-pulleys and a removable shaft passing through the tubular bushings, and the tube carrying the gang of saws for separating the gang of saws from the machine by withdrawing the shaft, substantially as set forth.

Signed by me this 2d day of May, 1896.

WILLIAM H. MYERS.

Witnesses:
GEO. T. PINCKNEY,
S. T. HAVILAND.